Dec. 1, 1931.  E. L. FOX  1,833,896
CONFECTION MOLD
Filed March 31, 1931
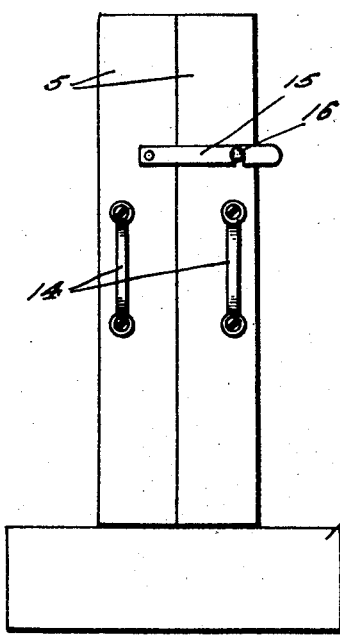
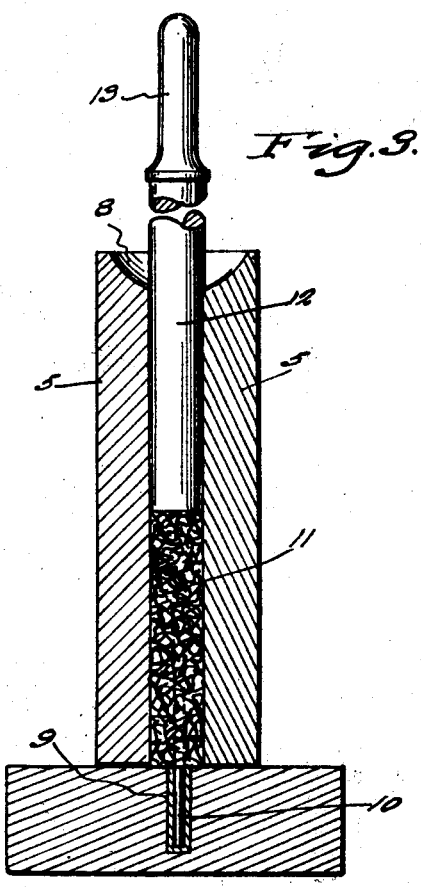
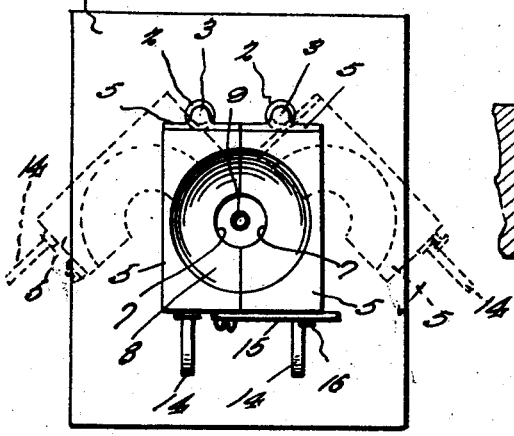
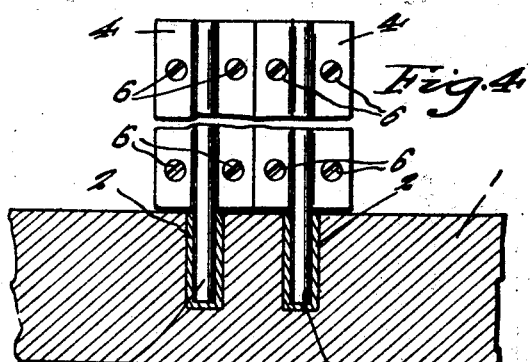
Inventor
Emmett L. Fox
By Clarence A. O'Brien
Attorney Patented Dec. 1, 1931

1,833,896

UNITED STATES PATENT OFFICE

EMMETT L. FOX, OF HINTON, WEST VIRGINIA

CONFECTION MOLD

Application filed March 31, 1931. Serial No. 526,681.

This invention relates to a confection mold and more particularly to a mold for use in making a pop-corn confection and has for its primary object to provide, in a manner as hereinafter set forth, a device of this character embodying a novel construction and arrangement of parts whereby a mass or body of pop-corn may be expeditiously compressed and mounted on a stick in a manner to provide an attractive article of food.

Other objects of the invention are to provide a confection of the character described which will be simple in construction, strong, durable, efficient and reliable in use and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a view in front elevation of a mold constructed in accordance with this invention.

Figure 2 is a view in top plan thereof.

Figure 3 is a view in vertical section through the mold.

Figure 4 is a fragmentary view in vertical section through the base and showing the mold sections in rear elevation.

Referring to the drawings in detail, it will be seen that the reference numeral 1 designates a flat base of any suitable material, preferably wood having a pair of socket bearings 2 extending downwardly thereinto from its upper side for rotatably receiving the downwardly projecting lower end portions of the pintles 3 which are formed integrally with the vertical exposed flat, metallic plates 4 having rigidly mounted thereon the complementary mold sections 5. The plates 4 are apertured for the passage of the screws 6 which secure the mold sections 5 thereon. It will thus be seen that the mold sections 5 are mounted for swinging movement in a horizontal plane toward and away from each other on the base 1. The mold sections 5 are also formed from any suitable material, preferably wood.

The inner or opposed sides of the mold sections 5 are provided with opposed grooves or channels 7 which define a bore which merges with a concavity 8 provided by recesses in the upper ends of the mold sections. The base 1 is further provided with a socket member 9 extending downwardly thereinto from its upper side, said socket member 9 being disposed co-axially with the bore between or in the mold sections 5 when said sections are in closed position. The socket member 9 is for the reception of the lower end portion of a stick 10 which projects upwardly from the base between the mold sections. The pop-corn is designated by the reference numeral 11 and is packed between the mold sections around the upwardly projecting portion of the stick 10 by a ram 12 which is adapted for reciprocation between the mold sections and which is provided with the handle portion 13 at its upper end.

On its forward side each of the mold sections 5 has mounted thereon a handle 14 to facilitate swinging the sections to open or closed position. One of the mold sections 5 also has mounted for swinging movement on its forward side a suitable latch member or keeper 15 for engagement with a headed pin 16 on the forward side of the other of the mold sections for releasably securing said sections together in closed position.

In use, the stick 10 is mounted in the socket member 9 after which the mold sections 5 are swung to closed position around the stick and secured by the elements 15 and 16. The popcorn which is coated with molasses is then inserted between the sections from the upper end thereof, the concavity 8 facilitating the operation of placing the pop-corn in the bore which is defined by the grooves or channels 7 in the sections. The ram 12 is then inserted in said bore and reciprocated in a manner to compress and pack pop-corn around the stick. In this manner the pop-corn is formed into a substantially cylindrical mass or body which is mounted on the stick 10. The mold sections 5 are then swung to open position, as illustrated in broken lines in Figure 2 of the drawings, after which the confection which has now been completed may be removed.

It is believed that the many advantages of a mold constructed in accordance with this invention will be readily understood, and although the preferred embodiment of the invention is as illustrated and described, it is to be understood that changes in the details of construction may be had which will fall within the scope of the invention as claimed.

What is claimed is:—

1. A confection mold of the character described comprising a base, a pair of spaced socket bearings in the base, a pair of complementary mold sections, vertical pintles rigidly mounted on the mold sections and insertable for rotation in the socket bearings in a manner to mount the mold sections for swinging movement in a horizontal plane toward and away from each other on the base, said mold sections having opposed channels in their inner sides defining a vertical bore when the sections are in closed position, a socket member disposed in the base co-axially with the bore, said socket member for the reception of the lower portion of a stick, the bore being for the reception of the confection, and means reciprocable in the bore for compressing and packing the confection around the stick.

2. A confection mold of the character described comprising a base, vertically disposed, spaced socket bearings extending downwardly into the base from the upper side thereof, a pair of complementary mold sections, elongated, flat plates rigidly secured on the mold sections, pintles formed integrally with the plates and depending therefrom into the socket bearings in a manner to mount the mold sections for swinging movement in a horizontal plane on the base, said mold sections having opposed channels in their inner sides extending vertically therein and defining a bore when the sections are in closed position, the upper portions of the sections further being formed to provide a concavity communicating with the bore, a vertically disposed socket member extending downwardly into the base from the upper side thereof and disposed co-axially with the bore, said socket member for the reception of a stick in a manner to support said stick in a vertical position centrally in the bore, said bore for the reception of the confection, a manually operable ram reciprocable in the bore for packing the confection around the stick in a manner to mount said confection on the stick.

3. A confection mold of the character described comprising a base, vertically disposed, spaced socket bearings extending downwardly into the base from the upper side thereof, a pair of complementary mold sections, elongated, flat plates rigidly secured on the mold sections, pintles formed integrally with the plates and depending therefrom into the socket bearings in a manner to mount the mold sections for swinging movement in a horizontal plane on the base, said mold sections having opposed channels in their inner sides extending vertically therein and defining a bore when the sections are in closed position, the upper portions of the sections further being formed to provide a concavity communicating with the bore, a vertically disposed socket member extending downwardly into the base from the upper side thereof and disposed co-axially with the bore, said socket member for the reception of a stick in a manner to support said stick in a vertical position centrally in the bore, said bore for the reception of the confection, a manually operable ram reciprocable in the bore for packing the confection around the stick in a manner to mount said confection on the stick, handles on the mold sections for swinging said sections to open or closed position, and means on the mold sections for releasably securing said sections in closed position.

In testimony whereof I affix my signature.

EMMETT L. FOX.